July 13, 1937.  A. NAGEL  2,087,005
SHUTTER RELEASE FOR FOLDING CAMERAS
Filed April 9, 1936
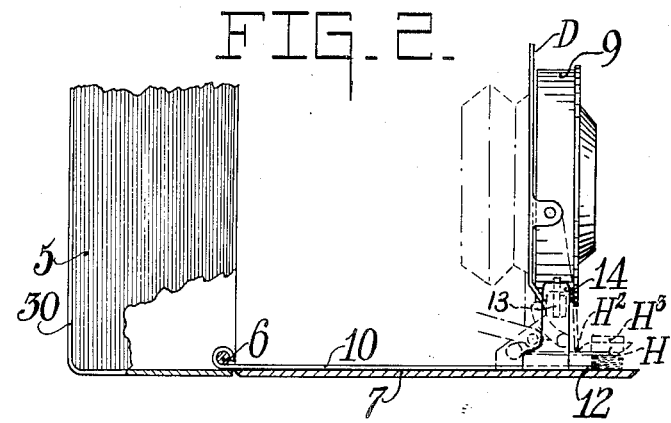
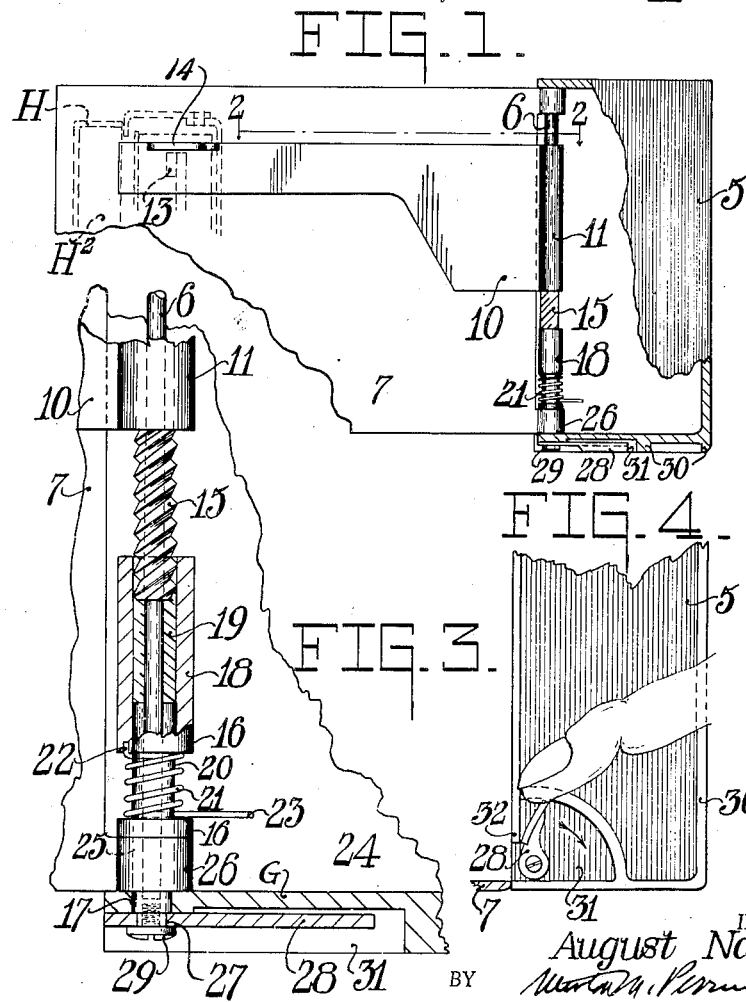
INVENTOR.
August Nagel,
BY
ATTORNEYS.

Patented July 13, 1937

2,087,005

UNITED STATES PATENT OFFICE 2,087,005

SHUTTER RELEASE FOR FOLDING CAMERAS

August Nagel, Stuttgart, Germany, assignor by mesne assignments, to Eastman Kodak Company, Jersey City, N. J., a corporation of New Jersey Application April 9, 1936, Serial No. 73,472
In Germany November 5, 1935

6 Claims. (Cl. 95—53)

This invention relates to photography and particularly to folding cameras having the shutter release mounted on the camera body thereof.

One object of my invention is to provide a folding camera in which the actuation of the shutter is effected by a release mounted on the camera body. Another object is to provide a folding camera in which the shutter release on the camera body is operably connected with the shutter trigger when the camera is opened to its picture-taking position. And still another object is to provide a folding camera wherein the actuation of the shutter is effected by a release on the camera body through a mechanism of simple structure which is rotatably and slidably mounted on the hinge between the camera body and the camera bed. And still another object is to provide a camera of the sort in which an actuation of the shutter is effected by a partial rotation of the shutter release on the camera body instead of by an axial pressure on said release. Another object is to provide a folding camera wherein the shutter release is mounted on the camera body but need not project laterally from the side wall of said camera body.

Briefly, my invention consists of a folding camera wherein a bed is rotatably hinged to the camera body to act as a front closing part for said body as well as a base on which the lens board and shutter are foldably mounted to be automatically or manually brought into picture-taking position when the bed is rotated to its open position. The motion transference member of the shutter is slidably mounted on the hinge axle of the bed and is slid axially of said hinge axle by virtue of the threaded engagement of a threaded portion connected with it and a threaded socket which is rotatably mounted on the axle, but fixed on said axle against axial movement therealong. The shutter release which is mounted on the side wall of the camera body is fixed to the threaded socket so that a rotation thereof will be transmitted to the actuating means of the shutter to cause an axial movement thereof transversely on the camera body and bed and to cause a subsequent actuation of the shutter through said movement.

The novel features that I consider characteristic of my invention are set forth with particularity in the appended claims. The invention itself, however, both as to its organization and its methods of operation, together with additional objects and advantages thereof, will best be understood from the following description of specific embodiments when read in conjunction with the accompanying drawing in which, Figure 1 is a plan view of a folding camera in extended position with certain parts thereof removed to show a preferred embodiment of my shutter release, Figure 2 is a side view of the camera taken on line 2—2 of Figure 1, Figure 3 is an enlarged plan view of a portion of the shutter actuating mechanism with certain parts in section to show their interengagement, Figure 4 is a partial side elevation of the camera showing the mounting of the shutter release on the camera wall.

Like reference characters refer to corresponding parts in the several figures.

As illustrated in Figure 1, a camera body 5 is provided with an axle 6 on which a bed 7 is rotatably hinged to swing from a position wherein it closes the camera body to a picture-taking position as shown.

A lens board D and a shutter 9 are shown in solid lines, foldably mounted on the forward end of bed 7, in accordance with U. S. 1,974,655, H. Nagel, September 25, 1934, so that they are automatically erected into a picture-taking position when the bed 7 is lowered. In order to close the camera, a spring pressed bridging bar H² between the locking arms H is depressed by applying pressure to the finger piece H³ conveniently arranged in the middle of the bar H². Since this particular type of shutter erecting mechanism is not essential to the present invention, but is shown merely for illustrative purposes, no detailed description of the same is given in this specification, but the operation of said apparatus can be found by referring to the above noted patent.

Although this type of lens and shutter erecting mechanism has been shown in connection with my novel shutter release, it is to be understood that the invention is not to be limited thereby, because this shutter release is adapted to operate with any type of folding camera wherein the shutter is brought to a given position on the camera bed for its picture-taking position whether it be accomplished manually or automatically.

Lever 10 rests on the bed 7 of the camera and has one end 11 slidably and rotatably mounted on the axle 6 while its other end 12 is loosely confined between the bridging bar H² and the bed 7 of the camera. The particular mounting for the forward end 12 of the lever 10 allows the lever to be slid transversely of the camera bed 7 to effect an actuation of the shutter trigger 13, but at the same time maintains the lever 10 in its position on the bed 7 when said bed is rotated to a closed position.

A finger 14 is provided near the forward end of the lever 10 in such a position that it will be in the path of the shutter trigger 13 when the shutter 9 and the lens board D are erected into their picture-taking positions so that a movement of the lever 10 transversely of the bed 7 will cause the finger thereon to contact shutter trigger 13 and effect a tripping thereof.

To the end 11 of the lever 10 there is fixed a threaded sleeve 15 which is also mounted on the axle 6 to slide with the end 11 of the lever 10. A release member 16 is rotatably mounted on the axle 6 and is journaled at 17 in the camera wall G. The release member 16 is provided with a socket portion 18 which is internally threaded at 19 to receive the threaded sleeve 15.

The release member 16 is provided with a reduced portion 20 in which a coil spring 21 is seated. One end of the coil spring 21 is fixed to the release member 16, as shown at 22, while the other end 23 is positioned on the base 24 of the camera body 5. Another reduced portion 25 is provided on the release member 16 to receive the bearing 26 of the camera bed 7 which serves as one of two mounting points whereby the bed 7 is rotatably mounted on the axle 6, and also serves as a spacing member between the release member 16 and the wall G of the camera body 5.

The end of the release member 16 is adapted to extend through the wall G of the camera body 5 and this end 27 is square to receive a square hole in the shutter release lever 28 so that the rotation of the lever 28 will effect a rotation of the release member 16 in the direction of the arrow. The release lever 28 is fixed to the square end of the releasing member 16 which projects through the wall of the camera body 5 by means of a screw 29.

The wall of the camera body 5 is provided with a series of ribs 30 which are so designed that a suitable recess 31 is provided around the release lever 28 of such a depth that the release lever will not protrude therefrom and become subjected to accidental actuation. This recess 31 could be made in a solid camera wall instead of being formed by means of rib 30 as I have illustrated without deviating from the spirit of my invention. The projection portion 32 of the rib 30 is adapted to extend into the path of the release lever 28 as shown in Figure 4, to act as a stop member to limit the rotation of the lever 28 and its associated releasing member 16 under the action of the coil spring 21.

This shutter release operates in the following manner. When the camera is open to a picture-taking position, the finger piece 14 on the lever 10 is automatically brought into the path of the finger 13 on the shutter 9. Then, after the camera has been properly focused on the subject to be photographed the shutter release 28 is rotated by the finger in the direction of the arrow as shown in Figure 4, it can be seen that a rotation of the shutter release lever 28 causes a rotation of the release member 16 against the action of the coil spring 21. As the socket portion 18 of the release member 16 is rotated, the threaded engagement between it and the sleeve 15 causes the sleeve to be pulled thereinto thus sliding the lever 10 along the axle 6 so that the finger-piece 14 on the forward end thereof actuates the shutter trigger 13. The threads on the sleeve 15 and in the socket 18 are of a steep pitch, so that a small rotation of the shutter release lever 28 causes a considerable sliding of the lever 10 transversely of the camera bed 7 on the axle 6.

Although I have shown and described certain specific embodiments of my invention, I am fully aware that many modifications thereof are possible. My invention, therefore, is not to be restricted except in so far as is necessitated by the prior art and by the spirit of the appended claims.

Having thus described my invention, what I declare as new and desire to secure by Letters Patent is:

1. In a folding camera, the combination with a camera body, a bed hinged to said camera body, a lens board and a shutter adapted to be brought into picture-taking position on said bed, of a shutter release mounted on said camera body, and suitable means operably connected to said shutter release and said shutter when the camera parts are in picture-taking position said means rotatably and slidably positioned in the camera at the point of hinging between the camera body and the bed.

2. In a folding camera, the combination with a camera body, an axle on the base of said camera body, a bed rotatably mounted on said axle, a lens board and a shutter foldably mounted on said bed and adapted to be moved from a folded position to a picture-taking position, a trigger on said shutter, a release lever on said camera body, and a suitable linkage operably connecting said release lever and said shutter when the camera parts are in picture-taking position, said linkage including an elongated lever having one end slidably and rotatably mounted on said axle while the other end extends longitudinally of the bed and into the path of the shutter trigger, and suitable means connecting said shutter release and said lever whereby said lever is slid axially along said axle to actuate the shutter trigger when the shutter release is rotated.

3. In a folding camera, the combination with a camera body, an axle on the case of said camera body, a bed rotatably mounted on said axle, a lens board and shutter foldably mounted on said bed and adapted to be moved from a closed position to a picture-taking position, a trigger on said shutter, a release lever on said camera body, and a suitable linkage for operably connecting said release lever and said shutter when the camera parts are in picture-taking position, said linkage including an elongated lever having one end slidably and rotatably mounted on said axle while the other end extends longitudinally of the bed and into the path of the shutter trigger, a threaded sleeve fixed to said lever and slidable along the axle, therewith, and a female threaded coupling rotatably mounted on said axle but prevented from axial movement along the axle, said coupling adapted to receive said threaded sleeve and be rotated by the release lever.

4. In a folding camera, the combination with a camera body, an axle on the base of said camera body, a bed rotatably mounted on said axle, a lens board and shutter foldably mounted on said bed and adapted to be moved from a closed position to a picture-taking position, a trigger on said shutter, a release lever on said camera body, and a suitable linkage for operably connecting said release lever and said shutter when the camera parts are in picture-taking position, said linkage including an elongated lever having one end slidably and rotatably mounted on said axle while the other end extends longitudinaly of the bed and into the path of the shutter trigger, a threaded sleeve fixed to said lever and slidable along the axle therewith, a female threaded coupling rotatably mounted on said axle but prevented from axial movement therealong, said coupling adapted to receive said threaded sleeve and be rotated by the release lever, and resilient means normally forcing said linkage to an inoperative position.

5. In a folding camera, the combination with a camera body, an axle on the base of said camera body, a bed rotatably mounted on said axle, a lens board and shutter foldably mounted on said bed and adapted to be moved from a closed to a picture-taking position, a trigger on said shutter, a recess in said camera body, of a shutter release mounted on said camera body in said recess and the movements of which are limited by the contour of said recess, a suitable linkage for operably connecting said release and said shutter when the camera parts are in picture-taking position, said linkage including an elongated lever having one end slidably and rotatably mounted on said axle while the other end thereof extends longitudinally of the bed and into the path of the shutter trigger, a threaded sleeve fixed to said lever and slidable along the axle, a female threaded coupling rotatably mounted on said axle but prevented from axial movement therealong, said coupling adapted to receive said threaded sleeve and be rotated by the release lever, and resilient means normally forcing said linking to its inoperative position.

6. In a folding camera, the combination with a camera body, an axle on the base of said camera body, a bed rotatably mounted on said axle and adapted to move from a closing position to a picture-taking position, a lens board and a shutter foldably mounted on said bed, a trigger on said shutter of a shutter release rotatably mounted on said camera body, an elongated lever slidably mounted on said bed and having one end rotatably and slidably mounted on said axle while the other end extends into the path of the shutter trigger, and suitable means connecting said shutter release and said lever whereby a rotation of said shutter release effects the sliding of said lever transversely of the camera body of the camera bed to actuate said shutter trigger.

AUGUST NAGEL.